(12) United States Patent
Chen et al.

(10) Patent No.: US 11,006,022 B2
(45) Date of Patent: May 11, 2021

(54) VIDEO SYSTEM AND RELATED METHOD

(71) Applicant: NOVATEK Microelectronics Corp., Hsin-Chu (TW)

(72) Inventors: Chieh-Cheng Chen, Changhua County (TW); Ting-Wei Chang, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 52 days.

(21) Appl. No.: 16/214,143

(22) Filed: Dec. 10, 2018

(65) Prior Publication Data

US 2019/0364176 A1 Nov. 28, 2019

Related U.S. Application Data

(60) Provisional application No. 62/675,176, filed on May 23, 2018.

(51) Int. Cl.
*H04N 5/14* (2006.01)
*G06K 9/00* (2006.01)

(52) U.S. Cl.
CPC ......... *H04N 5/147* (2013.01); *G06K 9/00718* (2013.01)

(58) Field of Classification Search
CPC .. G06K 9/00718; G11B 27/031; G11B 27/28; H04N 5/147
USPC ........................................................ 348/700
See application file for complete search history.

(56) References Cited

U.S. PATENT DOCUMENTS

| 5,732,146 | A | * | 3/1998 | Yamada | G06K 9/00711 348/14.15 |
| 5,805,733 | A | * | 9/1998 | Wang | G06K 9/00711 382/232 |
| 6,275,265 | B1 | * | 8/2001 | Kimura | H04N 5/126 348/505 |
| 6,497,366 | B1 | * | 12/2002 | Burkey | G06K 7/10851 235/462.25 |
| 6,975,808 | B1 | * | 12/2005 | Uchihara | H04N 5/76 348/143 |
| 7,852,412 | B1 | * | 12/2010 | Guerrero | H04N 5/21 348/606 |
| 10,136,134 | B2 | * | 11/2018 | Zhou | H04N 19/142 |
| 10,194,212 | B2 | * | 1/2019 | Lentzitzky | H04N 21/6587 |
| 2003/0147012 | A1 | * | 8/2003 | Hsiao | G11B 27/28 348/700 |
| 2004/0264788 | A1 | * | 12/2004 | Bazin | G06K 9/00711 382/239 |
| 2006/0078305 | A1 | * | 4/2006 | Arora | G11B 27/10 386/201 |
| 2008/0005302 | A1 | * | 1/2008 | Speicher | H04L 65/604 709/223 |
| 2013/0113999 | A1 | * | 5/2013 | Vashistha | G06K 9/00765 348/702 |

(Continued)

*Primary Examiner* — Gims S Philippe
(74) *Attorney, Agent, or Firm* — Winston Hsu

(57) ABSTRACT

A video system includes a scene analyzing circuit, configured to perform a scene analysis operation on a video signal and output a scene analysis result; and a video processing module, comprising a first video processing circuit, configured to perform a first video operation on the video signal and output a first processing result; and a second video processing circuit, configured to perform a second video operation on the first processing result according to the scene analysis result.

22 Claims, 5 Drawing Sheets

(56) References Cited

U.S. PATENT DOCUMENTS

| | | | |
|---|---|---|---|
| 2013/0163957 A1* | 6/2013 | Ikizyan | G06K 9/00751 386/241 |
| 2014/0078400 A1* | 3/2014 | Vajjhula | H04N 21/23418 348/571 |
| 2014/0078401 A1* | 3/2014 | Seigneurbieux | H04N 21/64784 348/584 |
| 2017/0098467 A1* | 4/2017 | Holly | G06F 16/252 |

* cited by examiner

VIDEO SYSTEM AND RELATED METHOD

CROSS REFERENCE TO RELATED APPLICATIONS

The present application claims the benefit of U.S. provisional application No. 62/675,176, filed on May 23, 2018 and incorporated herein by reference.

BACKGROUND OF THE INVENTION

1. Field of the Invention

The present invention relates to a video system and relate method, and more particularly, to a video system and relate method capable of timely adapting configuration for each frame according to scene type variation in a cost effective way.

2. Description of the Prior Art

Current video system is required to timely adapt the configuration(s) and the setting(s) of each video frames to perform scene-type-related operations, where the scene-type-related operation is performed based on the scene type information of each video frame. However, scene type recognition is a complicated operation. Conventional scene type recognizing devices may use complicated algorithm to perform scene type recognition, e.g., machine learning. Scene type recognizing devices, which are non-real-time devices, require more time to accomplish the scene type recognition operation.

To timely adapt the configuration(s) and the setting(s) of each frame, conventional video systems may comprise a plurality of complicated scene type recognizing devices, to perform parallel scene type recognitions on consecutive frames, which increases complexity and production cost.

Therefore, how to timely adapting configuration for each frame according to scene type variation in a cost effective way is a significant objective in the field.

SUMMARY OF THE INVENTION

It is therefore a primary objective of the present invention to provide a video system and relate method capable of timely adapting configuration for each frame according to scene type variation, to improve over disadvantages of the prior art.

An embodiment of the present invention discloses a video system, comprising a scene analyzing circuit, configured to perform a scene analysis operation on a video signal and output a scene analysis result; and a video processing module, comprising a first video processing circuit, configured to perform a first video operation on the video signal and output a first processing result; and a second video processing circuit, configured to perform a second video operation on the first processing result according to the scene analysis result.

An embodiment of the present invention further discloses a method applied in a video system. The method comprising performing a scene analysis operation on a video signal and output a scene analysis result; performing a first video operation on the video signal and output a first processing result; and performing a second video operation on the first processing result according to the scene analysis result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
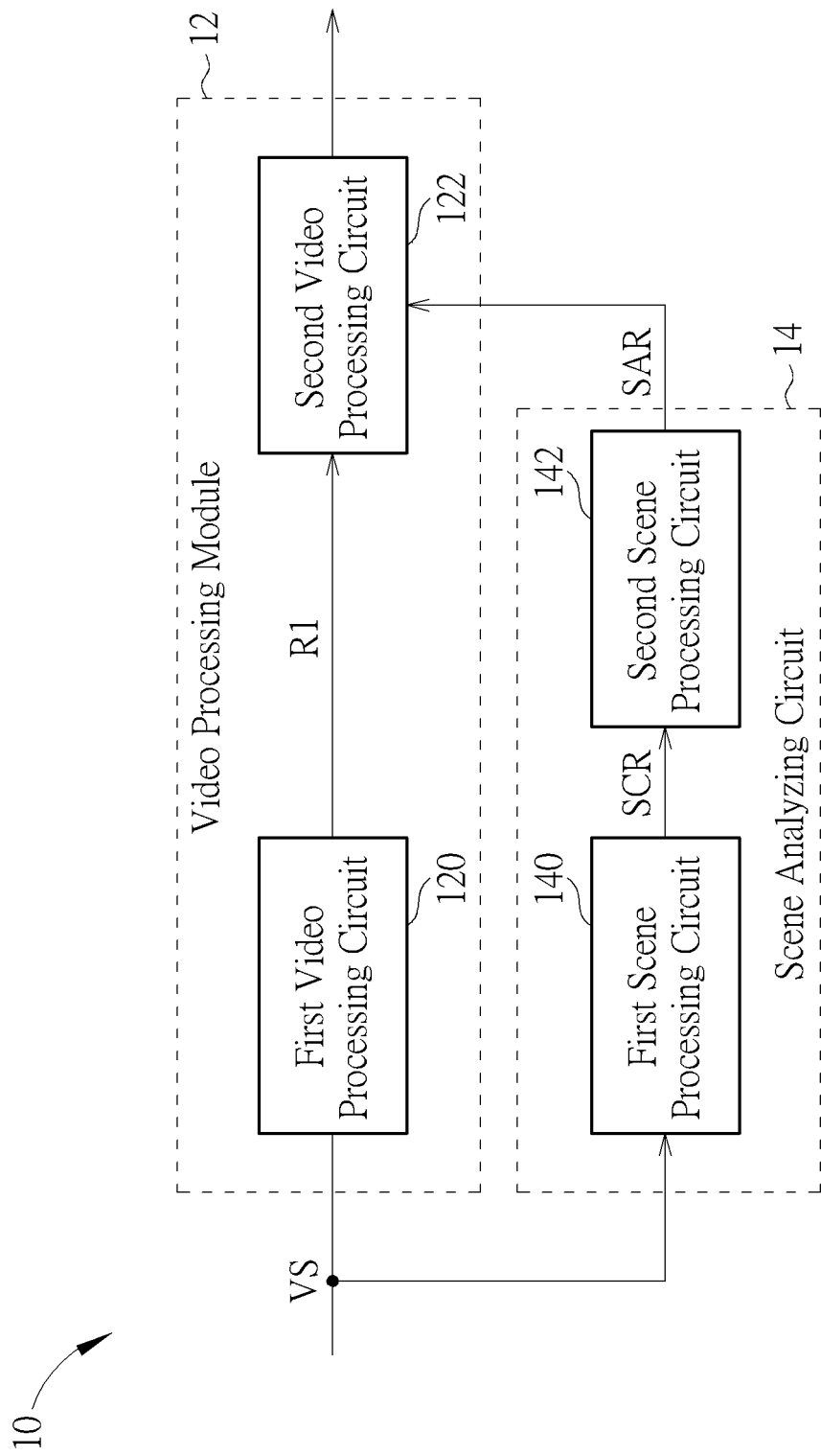
FIG. 1 is a schematic diagram of a video system according to an embodiment of the present invention.

FIG. 1 is a schematic diagram of a video system 10 according to an embodiment of the present invention. The video system 10 is able to timely perform scene-type-related operation on each frame, in a cost effective way. The video system 10 comprises a video processing module 12 and a scene analyzing circuit 14. The video processing module 12, which may, for example, be embedded inside a television. The video processing module 12 receives a video signal VS comprising a plurality of frames FR, performs video operations on the video signal VS, and sends the processed video signal to a displaying device (not shown), such that the displaying device is able to display the processed video signal. The scene analyzing circuit 14 is configured to perform a scene analysis operation on the video signal VS and output a scene analysis result SAR. The scene analysis result SAR may comprises scene type information corresponding to one or more frames FR within the video signal VS. The scene type information within the scene analysis result SAR may indicate that the frame FR comprises, for example, a sea scene, a mountain scene, a forest scene or a stadium scene, but not limited thereto.

The video processing module 12 comprises a first video processing circuit 120 and a second video processing circuit 122. The first video processing circuit 120 is configured to perform a first video operation on each frame FR, e.g., a frame $FR_i$, of the video signal VS and output a processing result R1 corresponding to the frame $FR_i$, where the first video operation may be irrelevant to the scene type of the frame FR or $FR_i$. The processing result R1 may be viewed as an intermediate result of an overall video operation performed by the video processing module 12. Meanwhile, the analyzing circuit 14 also performs the scene analysis operation on the frame $FR_i$ and produces the scene analysis result SAR corresponding to the frame $FR_i$. That is, the analyzing circuit 14 performs the scene analysis operation on the frame $FR_i$ at the time when the first video processing circuit 120 performs the first video operation on the frame $FR_i$. The second video processing circuit 122, receiving the scene analysis result SAR comprising the scene type information corresponding to the frame $FR_i$, is configured to perform a second video operation on the processing result R1 corresponding to the frame $FR_i$ according to the scene analysis result SAR corresponding to the frame $FR_i$, where the second video operation can be adapted to the scene type of the plurality of frames FR and may comprise adaptively applying the configuration corresponding to the frame $FR_i$ according to the scene type information of the frame $FR_i$.

Note that, the scene analyzing circuit 14 may require a time period T2 to accomplish the scene analysis operation on the frame $FR_i$. During the time period T2 when the analyzing circuit 14 performs the scene analysis operation on the frame $FR_i$, the video processing module 12 may exploit the first video processing circuit 120 to perform the first video operation which is not related to the scene type of the frame $FR_i$. At the time the first video operation is accomplished, or after the time the first video operation is accomplished, the scene analysis operation performed by the scene analyzing circuit 14 is also accomplished. Then, the second video processing circuit 122 is able to perform the second video operation which is related to the scene type of the frame $FR_i$ according to the scene analysis result SAR corresponding to the frame $FR_i$. Therefore, the second video operation is able to timely adapt to the scene type of the frame $FR_i$.

Suppose that the first video processing circuit 120 needs a time period T1 to accomplish the first video operation for the frame $FR_i$. In general, the time period T1 is required to be larger than or equal to the time period T2. Or equivalently, the time period T2 is smaller than or equal to the time period T1, such that the second video processing circuit 122 is able to obtain the scene analysis result SAR in time. In an embodiment, given the time period T2 is (N+1) frame delays, the time period T1 may be (N+1) frame delays or more than (N+1) frame delays, where one frame delay may be a reciprocal of a frame rate of the video system 10, and N is an integer greater than 1.

The scene analyzing circuit 14 comprises a first scene processing circuit 140 and a second scene processing circuit 142. The first scene processing circuit 140 may be configured to perform a course/first scene analysis operation, and the second scene processing circuit 142 may be configured to perform a fine/second scene analysis operation. In general, a scene analyzing time TA1 required for the course/first scene analysis operation is smaller than a scene analyzing time TA2 required for the fine/second scene analysis operation. In an embodiment, the scene analyzing time TA1 may be 1 frame delay and the scene analyzing time TA2 may be N frame delays.

In an embodiment, the course/first scene analysis operation may comprise a scene change detection, and the fine/second scene analysis operation may comprise a scene type recognition. Given a scene type variation between two consecutive frames, e.g., $FR_i$ and involves a scene change, the scene analyzing circuit 14 may utilize the first scene processing circuit 140 to detect whether a scene change is happened between the frames $FR_i$ and $FR_{i-1}$. In some embodiments, if the first scene processing circuit 140 detects the scene change between the frames $FR_i$ and the second scene processing circuit 142 in the scene analyzing circuit 14 can responsively perform the scene type recognition. Conversely, if the first scene processing circuit 140 detects no scene change occurs, the second scene processing circuit 142 may not perform scene type recognition or maintain its current operation. In some embodiments, after the second scene processing circuit 142 accomplishes the scene type recognition, the second scene processing circuit 142 may not perform scene type recognition, until next time the first scene processing circuit 140 detects a next scene change. In some other embodiments, the second scene processing circuit 142 performs the scene type recognition all the time. Once the first scene processing circuit 140 detects that there is a scene change occurred between two frames, the second scene processing circuit 142 would terminate the ongoing cycle and re-initiate or re-start a new cycle of the scene type recognition.

To perform the scene change detection, the first scene processing circuit 140 may compute a difference Diff as $Diff=|FR_i-FR_{i-1}|$ or $Diff=|FR_i-FR_j|$, where $|\cdot|$ represents an element-wise (pixel-wise) summation of a frame. If the difference Diff is greater than a specific threshold r, then the first scene processing circuit 140 generates a scene change result SCR indicating that there is a scene change between the frames $FR_i$ and $F_{1-1}$. Otherwise, the first scene processing circuit 140 may generate a scene change result SCR indicating that there is no scene change between the frames $FR_i$ and $FR_{i-1}$.

The second scene processing circuit 142 may comprise a neural network processing unit (NPU). NPU is suitable for matrix/vector computation and usually applied to complicated video processing such as scene type recognition. However, since the second scene processing circuit 142 or NPU requires more time to perform the scene type recognition, a frame rate which can be processed by the second scene processing circuit 142 is lower the frame rate of the video system 10. For example, suppose that the frame rate of the video system 10 is 60 Hz, the frame rate of the second scene processing circuit 142 is only 20 Hz. That is, given the video system 10 is able to process 60 frames in 1 second, but the second scene processing circuit 142 can process 20 frames in 1 second. In this case, the second scene processing circuit 142 may perform the fine/second scene analysis operation, i.e., the scene type recognition, on every 3 frames of the video signal VS. For example, the scene type recognition is performed on frames $FR_{j+3 \cdot k}$ within the video signal VS, where both j and k are integers. Thus, the NPU is regarded as a non-real-time device.

Figure 2:
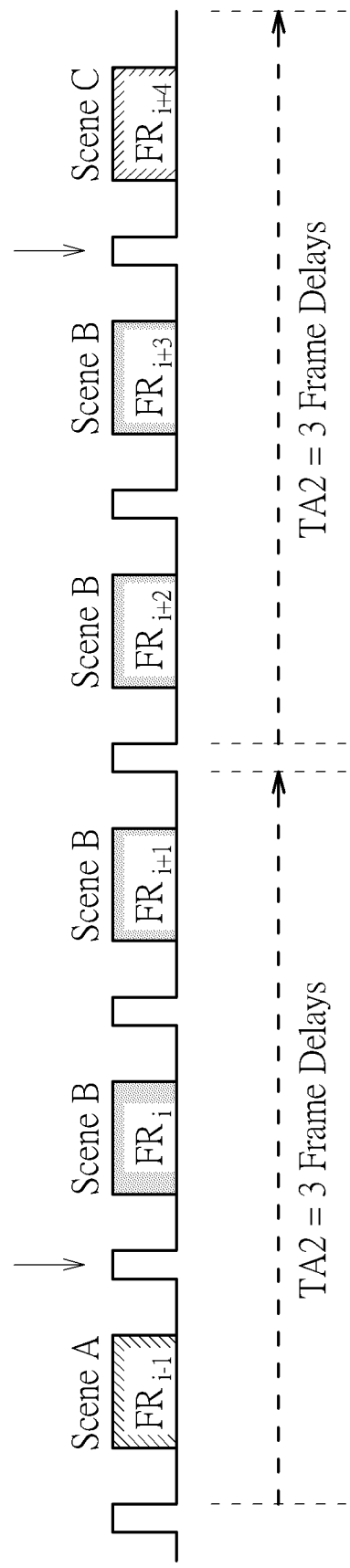
FIG. 2 is a timing diagram of a plurality of frames and an operation of a second scene processing circuit according to an embodiment of the present invention.

Only applying the non-real-time NPU to perform the scene type recognition is insufficient, since the video system is not able to timely perform the scene-type-related operation on each frame. FIG. 2 is a timing diagram of the frames $FR_{i-1}$-$FR_{i+4}$ and an operation of the NPU. In FIG. 2, the bold dashed line represents time periods of the NPU performing the scene type recognition, and the downward arrows indicate the time instances at which scene changes happen/occur. It is assumed that there is no scene change detector to assist the NPU in the video system. As a non-real-time device, the NPU only performs the scene type recognition on every N frames, instead of every frames, of the video signal VS. In the example illustrated in FIG. 2, N=3 and the NPU performs the scene type recognition on the frames FR and $FR_{i+2}$. In this case, if there is a scene change between the frames $FR_i$ and $F_{i-1}$, the NPU is not able to timely realize the scene change is happened, and the video system is not able to timely perform the scene-type-related operation on each frame.

Specifically, after the scene-type-irrelevant operation is performed on the frame $FR_{i-1}$ by the first video processing circuit and the scene type recognition on the frame $FR_{i-1}$ is accomplished, the second video processing circuit may obtain the scene type information corresponding to the frame to perform the scene-type-related operation on the frame $FR_{i-1}$ according to the scene type information corresponding to the frame which is "scene A" as FIG. 2 illustrated. However, at the time the video system receives the frame $FR_i$, or when the frame $FR_i$ comes, the NPU is performing the scene type recognition on the previous frame $FR_{i-1}$ and has no time to perform the scene type recognition on the frame $FR_i$, and thus, the NPU is not able to inform the second video processing circuit about the scene type information corresponding to the frame $FR_i$, which is "scene B". Therefore, the second video processing circuit still performs the scene-type-related operation on the frame $FR_i$ according to the latest scene type information, which is "scene A" and is incorrect for the frame $FR_i$. Hence, the second video processing circuit would apply wrong configuration(s) or setting(s) for the scene-type-related operation performed on the frame $FR_i$, since the second video processing circuit is not notified that the scene type has been changed from "scene A" to "scene B" at the time the second video processing circuit performs the scene-type-related operation on the frame $FR_i$.

Figure 3:
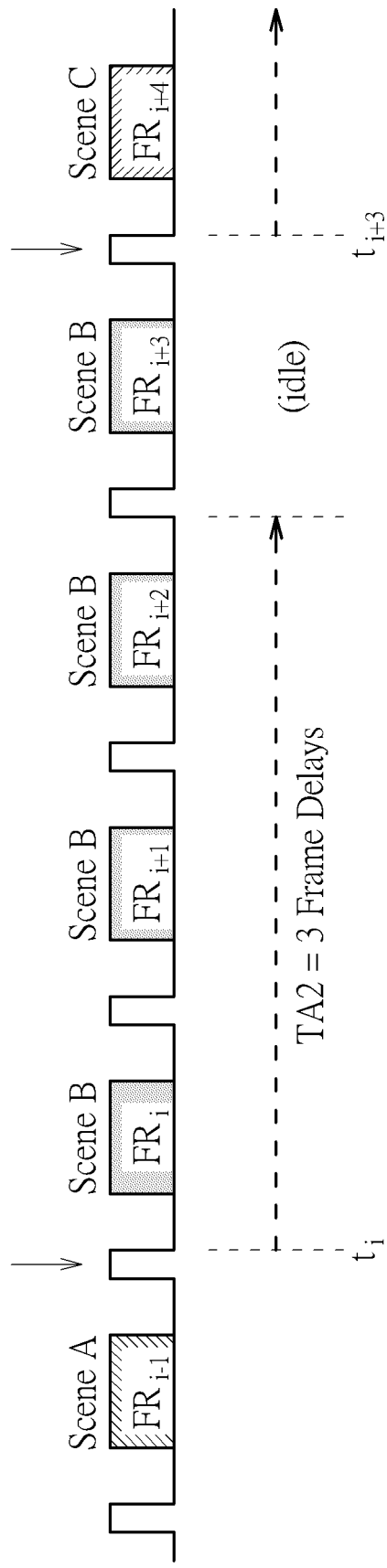
FIG. 3 is a timing diagram of a plurality of frames and an operation of a second scene processing circuit according to an embodiment of the present invention.

On the contrary, the scene analyzing circuit 14 utilizes the first scene processing circuit 140, which may comprise a scene change detector, to perform the scene change detection. FIG. 3 is a timing diagram of the frames $FR_{i-1}$–$FR_{i+4}$ and the operation of the second scene processing circuit 142. In FIG. 3, the bold dashed line represents the time period of the second scene processing circuit 142 (NPU) performing the scene type recognition, and the downward arrows indicate the time instances at which scene changes happen/occur. Given the scene change is happened between the frames $FR_i$ and $F_{i-1}$, and the second scene processing circuit 142 is informed by the first scene processing circuit 140 (scene change detector) that the scene change is happened between the frames $FR_{i-1}$ and $FR_i$. The second scene processing circuit 142 (NPU) may perform the scene type recognition starting from a time $t_i$. That is, the second scene processing circuit 142 may be regarded as being triggered by the first scene processing circuit 140 at the time $t_i$.

After the first video processing circuit 120 accomplishes the scene-type-irrelevant operation (i.e., the first video operation) on the frame $FR_i$, the second scene processing circuit 142 also accomplishes the scene type recognition on the frame $FR_i$. Then, the second video processing circuit 122 is notified about the scene type corresponding to the frame $FR_i$ before the scene-type-related operation (i.e., the second video operation) performed on the frame $FR_i$ starts. Thus, the second video processing circuit 122 is able to apply the correct configuration(s) or setting(s) for the scene-type-related operation performed on the frame $FR_i$. In an embodiment, after the second scene processing circuit 142 accomplishes the scene type recognition, the second scene processing circuit 142 may enter into an idle mode or an idle status, performing no scene type recognition, until next time the first scene processing circuit 140 detects a next scene change, e.g., a scene change between the frames $FR_{i+3}$ and $FR_{i+4}$.

In another perspective, the second scene processing circuit 142 may be triggered by the first scene processing circuit 140 to perform the scene type recognition (the second scene analysis operation). After the second scene processing circuit 142 is triggered by the first scene processing circuit 140, the second scene processing circuit 142 (NPU) may perform a first cycle of the second scene analysis operation, where the first cycle is represented by the bold dashed line covering 3 frame delays right after the time $t_i$ in FIG. 3. After the first cycle of the second scene analysis operation ends, the second scene processing circuit 142 temporarily stops performing the second scene analysis operation, until next time the second scene processing circuit 142 is triggered again by the first scene processing circuit 140, e.g., at a time $t_{i+3}$, to perform a second cycle of the second scene analysis operation (scene type recognition). In FIG. 3, the second cycle is represented by the bold dashed line right after the time $t_{i+3}$.

In the embodiment illustrated in FIG. 3, the second scene processing circuit 142 performs the second scene analysis operation only when the second scene processing circuit 142 is triggered. If the second scene processing circuit 142 is not triggered, the second scene processing circuit 142 does not perform the second scene analysis operation.

The mechanism illustrated in FIG. 3, in which the second scene processing circuit 142 is triggered by the first scene processing circuit 140, suffers from miss detection. If a scene change indeed occurs but the first scene processing circuit 140 fails to detect that, i.e., miss detection, then the second scene processing circuit 142 would remain idle and would not perform any scene type recognition. The configuration(s) and the setting(s) may be incorrect from the time of miss detection.

Figure 4:
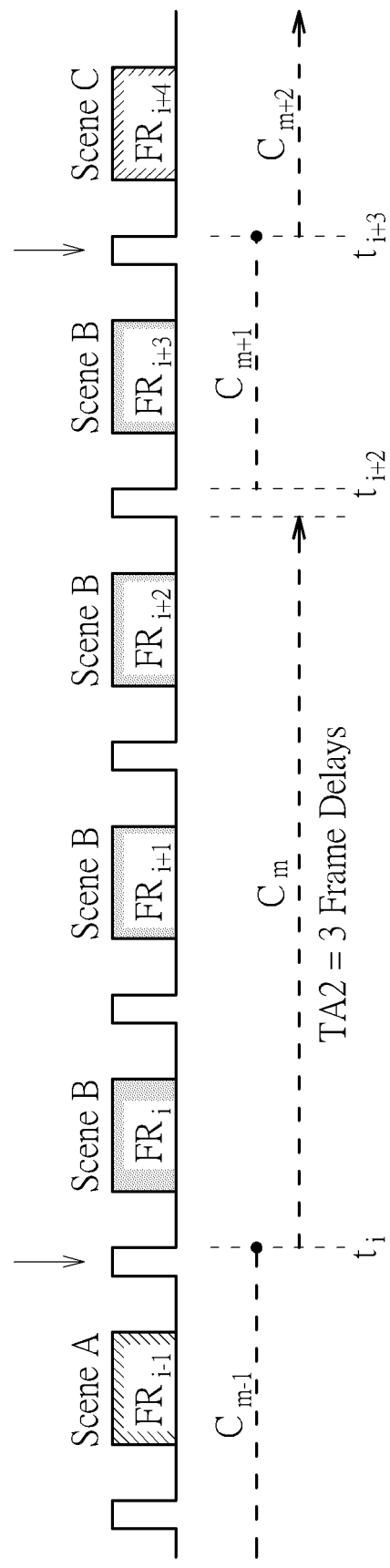
FIG. 4 is a timing diagram of a plurality of frames and an operation of a second scene processing circuit according to an embodiment of the present invention.

To avoid problem brought by miss detection, please refer to FIG. 4. FIG. 4 is a timing diagram of the frames $FR_{i-1}$–$FR_{i+4}$ and the operation of the second scene processing circuit 142. In FIG. 4, the bold dashed line represents the time periods of the second scene processing circuit 142 performing the scene type recognition, and the downward arrows indicate the time instances at which scene changes happen/occur. Different from FIG. 3, the second scene processing circuit 142 keeps performing the scene type recognition. In an embodiment, the second scene processing circuit 142 performs the scene type recognition all the time.

As can be seen from FIG. 4, before the time $t_i$, the second scene processing circuit 142 is performing a cycle $C_{m-1}$ of the scene type recognition. Once the first scene processing circuit 140 detects the scene change between the frames $FR_{i-1}$ and $FR_i$ and the second scene processing circuit 142 receives the scene change result SCR, which indicates that there is a scene change occurred between the frames $FR_{i-1}$ and $FR_i$, at the time $t_i$, the second scene processing circuit 142 would terminate the ongoing cycle $C_{m-1}$ and re-initiate or re-start a new cycle $C_m$ of the scene type recognition, even though the cycle $C_{m-1}$ of the scene type recognition is not accomplished at the time $t_i$. Suppose that there is no scene change between the time $t_i$ and a time $t_{i+2}$, the second scene processing circuit 142 may complete the cycle $C_m$ of the scene type recognition, and re-start a new cycle $C_{m+1}$ of the scene type recognition at the time $t_{i+2}$, if no scene change is detected at the time $t_{i+2}$. Similarly, when the second scene processing circuit 142 receives the scene change result SCR indicating that a scene change occurs between the frames $FR_{i+3}$ and $FR_{i+4}$ at a time $t_{i+3}$, the second scene processing circuit 142 would terminate the ongoing cycle $C_{m+1}$ and re-start a new cycle $C_{m+2}$ of the scene type recognition.

The mechanism illustrated in FIG. 4, in which the second scene processing circuit 142 keeps performing the scene type recognition, is able to correct the configuration(s) and the setting(s), even though the first scene processing circuit 140 fails/misses to detect the scene change. Specifically, suppose that the first scene processing circuit 140 fails/misses to detect the scene change at a time $t_x$, the second scene processing circuit 142 would initiate a new cycle $C_x$ of the scene type recognition at a time $t_{x'}$ which is couple of frame delays later than the time $t_x$. Thus, the correct configuration(s) and the setting(s) would be corrected after the cycle $C_x$ of the scene type recognition is completed, even though the first scene processing circuit 140 fails/misses to detect the scene change at the time $t_x$.

Figure 5:
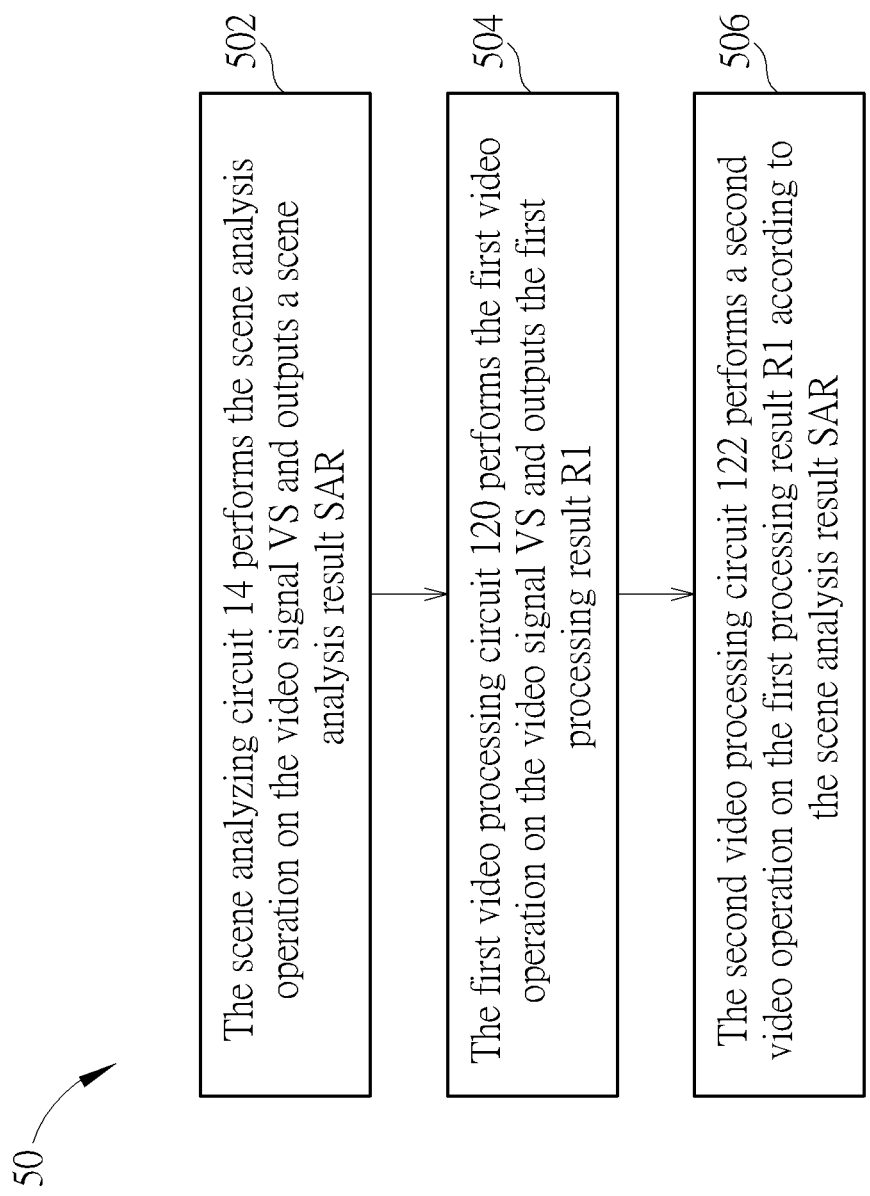
FIG. 5 is a schematic diagram of a process according to an embodiment of the present invention

Operations of the video system 10 can be summarized into a process 50 as shown in FIG. 5. The process 50 comprises the following steps:

Step 502: The scene analyzing circuit 14 performs the scene analysis operation on the video signal VS and outputs a scene analysis result SAR.

Step 504: The first video processing circuit 120 performs the first video operation on the video signal VS and outputs the first processing result R1.

Step 506: The second video processing circuit 122 performs a second video operation on the first processing result R1 according to the scene analysis result SAR.

Details of the process 50 may be referred to paragraphs stated in the above, which is not narrated herein for brevity.

In the prior art, to timely adapt the configuration(s) and the setting(s) of each frames, the video system may comprise a plurality of scene type recognizing devices to perform parallel scene type recognitions on consecutive frames. The scene type recognizing device may utilize complicated algorithms, e.g., machine learning, to perform scene type recognition. The complexity and production cost of the video system capable of timely adapting the configuration(s) and the setting(s) are high. In comparison, embodiments of the present disclosure can utilize the first scene processing circuit to perform scene change detection and utilizes the second scene processing circuit to perform scene type recognition in response to the scene change result generated by the first scene processing circuit. In such implementations, scene type recognition requiring longer time can be performed based on detection of scene change result requiring shorter time. Thereby, the video system is able to timely adapt the configuration(s) and the setting(s) of each frame. In some embodiments, one single scene type recognizing device (e.g., the NPU) can be utilized. The NPU has low complexity compared to the conventional scene type recognizing device using machine learning algorithm. The complexity and production cost is effectively reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video system, comprising:
   a scene analyzing circuit, configured to perform a scene analysis operation on a video signal and output a scene analysis result; and
   a video processing module, comprising:
      a first video processing circuit, configured to perform a first video operation on the video signal and output a first processing result; and
      a second video processing circuit, configured to perform a second video operation on the first processing result according to the scene analysis result;
   wherein the first video operation comprises a partial operation of converting the video signal into a processed video signal displayable by a displaying device;
   wherein the scene analyzing circuit performs the scene analysis operation on a specific frame of the video signal at a time when the first video processing circuit performs the first video operation on the specific frame of the video signal.

2. The video system of claim 1, wherein the first video processing circuit requires a first time period to accomplish the first video operation for a frame, the scene analyzing circuit requires a second time period to accomplish the scene analysis operation for the frame, and the second time period is smaller than or equal to the first time period.

3. The video system of claim 1, wherein the scene analysis result comprises a scene type information of at least one frame of the video signal.

4. The video system of claim 3, wherein the second video operation comprises adaptively applying a configuration on the at least one frame according to the scene type information of the frame.

5. The video system of claim 1, wherein the scene analyzing circuit comprises:
   a first scene processing circuit, comprising a scene change detector, configured to perform a first scene analysis operation on the video signal and output a scene change result, wherein the first scene analysis operation comprises a scene change detection,
   a second scene processing circuit, configured to perform a second scene analysis operation on the video signal according to the scene change result outputted from the first scene processing circuit and output the scene analysis result, wherein the second scene analysis operation comprises a recognition of scene type.

6. The video system of claim 5, wherein the second scene processing circuit comprises a neural network processing unit (NPU).

7. The video system of claim 5, wherein the first scene processing circuit computes a difference between two consecutive frames, and the first scene processing circuit outputs the scene result to indicate an occurrence of a scene change between the two consecutive frames when the difference is greater than a threshold.

8. The video system of claim 5, wherein the second scene processing circuit is triggered by the first scene processing circuit to perform the second scene operation when a first scene change occurs at a first time.

9. The video system of claim 8, wherein after the second scene processing circuit is triggered by the first scene processing circuit and performs a first cycle of the second scene analysis operation, the second scene processing circuit stops performing the second scene analysis operation, until a second scene change occurs at a second time.

10. The video system of claim 5, wherein the second scene processing circuit continues performing the second scene analysis operation.

11. The video system of claim 10, wherein when the second scene processing circuit continues performing the second scene analysis operation, the second scene processing circuit terminates an ongoing cycle of the second scene analysis operation and initiate another cycle of the second scene analysis operation when a scene change occurs.

12. The video system of claim 1, wherein the second video processing circuit, performs the second video operation on the first processing result according to the scene analysis result, to output a second processing result for a displaying device to display based on the second processing result.

13. A method, applied in a video system, the method comprising:
   performing a scene analysis operation on a video signal and output a scene analysis result;
   performing a first video operation on the video signal and output a first processing result; and
   performing a second video operation on the first processing result according to the scene analysis result;
   wherein the first video operation comprises a partial operation of converting the video signal into a processed video signal displayable by a displaying device;
   wherein the method comprises performing the scene analysis operation on a specific frame of the video signal at a time when performing the first video operation on the specific frame of the video signal.

14. The method of claim 13, wherein the first video processing circuit requires a first time period to accomplish the first video operation for a frame, the scene analyzing circuit requires a second time period to accomplish the scene analysis operation for the frame, and the second time period is smaller than or equal to the first time period.

15. The method of claim 13, wherein the scene analysis result comprises a scene type information of at least one frame of the video signal.

16. The method of claim 15, wherein the second video operation comprises adaptively applying a configuration on the at least one frame according to the scene type information of the frame.

17. The method of claim 13, wherein the step of performing the scene analysis operation on a video signal and output a scene analysis result comprises:
   performing a first scene analysis operation on the video signal and output a scene change result, wherein the first scene analysis operation comprises a scene change detection; and
   performing a second scene analysis operation on the video signal according to the scene change result and outputting the scene analysis result, wherein the second scene analysis operation comprises a recognition of scene type.

18. The method of claim 17, wherein the second scene analysis operation is triggered by a first scene change result when a first scene change occurs at a first time.

19. The method of claim 18, further comprising:
   after the second scene analysis operation is triggered by the first scene change result and a first cycle of the second scene analysis operation is performed, stopping performing the second scene analysis operation, until a second scene change occurs at a second time.

20. The method of claim 17, further comprising:
   continuing performing the second scene analysis operation.

21. The method of claim 20, further comprising:
   during an ongoing cycle in which the second scene analysis operation is performing, terminating the ongoing cycle of the second scene analysis operation and initiating another cycle of the second scene analysis operation when a scene change occurs.

22. The method of claim 13, wherein the step of performing the second video operation on the first processing result according to the scene analysis result comprises:
   performing the second video operation on the first processing result, to output a second processing result for a displaying device to display based on the second processing result.

* * * * *